US006846352B2

(12) United States Patent
Yatake

(10) Patent No.: US 6,846,352 B2
(45) Date of Patent: Jan. 25, 2005

(54) INK COMPOSITION FOR INK-JET RECORDING AND INK SET COMPRISING THE SAME

(75) Inventor: Masahiro Yatake, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/914,482

(22) PCT Filed: Dec. 28, 2000

(86) PCT No.: PCT/JP00/09437

§ 371 (c)(1),
(2), (4) Date: Aug. 28, 2001

(87) PCT Pub. No.: WO01/48101

PCT Pub. Date: Jul. 5, 2001

(65) Prior Publication Data

US 2003/0037699 A1 Feb. 27, 2003

(30) Foreign Application Priority Data

Dec. 28, 1999 (JP) ............................. 11-375315

(51) Int. Cl.$^7$ ............................................. C09D 11/00
(52) U.S. Cl. ............................... 106/31.58; 106/31.86; 106/31.59; 106/31.89
(58) Field of Search ..................... 106/31.58, 31.86, 106/31.59, 31.89

(56) References Cited

U.S. PATENT DOCUMENTS

| | | | |
|---|---|---|---|
| 4,986,850 A | 1/1991 | Iwata et al. | |
| 5,156,675 A | 10/1992 | Breton | |
| 5,169,437 A | 12/1992 | You | 106/20 |
| 5,180,425 A | 1/1993 | Matrick et al. | 106/22 |
| 5,183,502 A | 1/1993 | Meichsner | |
| 5,196,056 A | 3/1993 | Prasad | |
| 5,356,464 A * | 10/1994 | Hickman et al. | 106/31.36 |
| 5,364,461 A | 11/1994 | Beach | |
| 5,700,315 A * | 12/1997 | Wenzel | 106/31.58 |
| 5,849,067 A | 12/1998 | Tsuchiya | |
| 5,910,211 A * | 6/1999 | Ueda et al. | 106/31.43 |
| 5,926,191 A | 7/1999 | Kanematsu et al. | 347/5 |
| 5,928,419 A * | 7/1999 | Uemura et al. | 106/493 |
| 6,019,828 A * | 2/2000 | Rehman | 106/31.58 |
| 6,145,962 A | 11/2000 | Kanematsu et al. | 347/43 |
| 6,432,186 B1 * | 8/2002 | Taniguchi | 106/31.58 |
| 6,447,592 B1 * | 9/2002 | Taniguchi | 106/31.58 |

FOREIGN PATENT DOCUMENTS

| | | | |
|---|---|---|---|
| DE | 42 27 600 A1 | 2/1993 | |
| EP | 0879858 | 11/1998 | |
| EP | 1 010 802 A2 | 6/2000 | ........... 5/20 |
| JP | 56163168 | 12/1981 | |
| JP | 56-163168 | 12/1981 | |
| JP | 02-127482 | 5/1990 | |
| JP | 02127482 | 5/1990 | |
| JP | 03(1991)-152170 | 6/1991 | ........... C09D/11/00 |
| JP | 418465 | 1/1992 | |
| JP | 04-018465 | 1/1992 | |
| JP | 04 018465 | 1/1992 | |
| JP | 04(1992)-18465 | 1/1992 | ........... C09D/11/00 |
| JP | 05-214282 | 8/1993 | |
| JP | 6-504576 | 5/1994 | |
| JP | 07-157698 | 6/1995 | |
| JP | 07(1995)-157698 | 6/1995 | ........... C09D/11/00 |
| JP | 09(1997)-328644 | 12/1997 | ........... C09D/11/00 |
| JP | 10-211693 | 8/1998 | |
| JP | 11-349871 | 12/1999 | |
| JP | 265095 | 9/2000 | |
| WO | 93-09194 | 5/1993 | |

OTHER PUBLICATIONS

Patent Abstracts of Japan of JP 56–163168 dated Dec. 15, 1981.

Patent Abstracts of Japan of JP 11–349871 dated Dec. 21, 1999.

Patent Abstracts of Japan of JP 05–214282 dated Aug. 24, 1993.

Patent Abstracts of Japan of JP 04–018465 dated Jan. 22, 1992.

Patent Abstracts of Japan of JP 07–157698 dated Jun. 20, 1995.

(List continued on next page.)

Primary Examiner—Mark L. Bell
Assistant Examiner—Veronica F. Faison
(74) Attorney, Agent, or Firm—Ladas & Parry

(57) ABSTRACT

An object of the present invention is to provide an ink composition for ink jet recording, which can produce high-quality prints and has excellent ejection stability, and to provide an ink set using the same. The ink composition for ink jet recording according to the present invention is characterized by comprising at least a compound represented by formula (I)

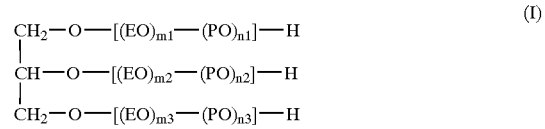

wherein

EO represents an ethyleneoxy group;

PO represents a propyleneoxy group;

m1, m2, m3, n1, n2, and n3 each are independently 0 (zero) or a natural number of not less than 1;

EO and PO may be arranged, regardless of order in the parentheses [ ], randomly or as blocks joined together; and m1+m2+m3+n1+n2+n3 is in the range of 0.5 to 10 in terms of number average of a mixture of compounds represented by formula (I), and a colorant, provided that when, in formula (I), all of n1, n2, and n3 are zero, the ink composition further comprises glycerin.

23 Claims, No Drawings

OTHER PUBLICATIONS

Patent Abstracts of Japan of JP 10–21 1693 dated Aug. 11, 1998.
Patent Abstracts of Japan of JP 02–127482 dated May 16, 1990.
JPO Abstract 03(1991)–152170, Jun. 28, 1991.
Japan Abstract 4–18465, (Canon Inc.) Jan. 22, 1992.
Japan Abstract 56163168, (The Pilot Pen Co., Ltd.), Dec. 15, 1981.
Japan Abstract 02127482, (Canon Inc.) May 16, 1990.
JP 2000–265095, A (Seiko Epson Corporation) Sep. 26, 2000.
English Translation of Abstract and Title of JP 04018465 Dated Jan. 22, 1992.

* cited by examiner

INK COMPOSITION FOR INK-JET RECORDING AND INK SET COMPRISING THE SAME

BACKGROUND OF THE INVENTION

1. Field of the Invention

The present invention relates to an ink composition for ink jet recording, and an ink set comprising the same.

2. Background Art

Ink jet recording is a printing method wherein droplets of an ink composition are ejected and deposited on recording media, such as paper, to print, for example, letters or figures. The feature of the ink jet recording method is that images having a combination of high resolution with high quality can be printed at a high speed by means of a relatively inexpensive apparatus.

Examples of ink jet recording methods which have been put to practical use include: a method wherein an electric signal is converted to a mechanical signal using an electrostrictive element to intermittently eject an ink reservoired in a nozzle head section, thereby recording letters or symbols on the surface of a recording medium; and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Various properties required of ink compositions used in the above ink jet recording are such that the drying property of the print is good, no significant feathering is created in printed images, uniform printing can be realized on the surface of conventional recording media, and, in the case of multi-color printing, mixing between adjacent colors does not occur. Further, what is important to ink compositions is to ensure satisfactory ejection stability of ink at actual service temperatures of ink jet recording apparatuses.

To ensure these properties, various studies have hitherto been made on additives to ink compositions.

For example, they have proposed the use of an additive for lowering the surface tension of the ink composition to increase the penetration speed of the ink composition into paper and thus to reduce feathering or bleeding. More specifically, the use of diethylene glycol monobutyl ether (U.S. Pat. No. 5,156,675) or Surfynol 465 (manufactured by Air Products and Chemicals Inc., U.S.A.) (U.S. Pat. No. 5,183,502) as an acetylene glycol surfactant or the combined use of diethylene glycol monobutyl ether and Surfynol 465 (U.S. Pat. No. 5,196,056) has been proposed. Further, an ink composition has been proposed which contains, as a wetting agent, polyglycerin (Japanese Patent Laid-Open No. 152170/1991), polyglycerin with an ethyleneoxy group added thereto (Japanese Patent Laid-Open No. 328644/1997), or glycerin with an ethyleneoxy group added thereto (Japanese Patent Laid-Open No. 18465/1992).

For these conventional ink compositions, however, there is still room for improvement. Specifically in the case of printing on plain paper, for example, mere addition of an adduct of ethyleneoxy groups with glycerin to ink compositions sometimes causes prolongation of drying time due to high surface tension. Therefore, when printing is continuously carried out on a plurality of sheets, there is fear that satisfactory drying time cannot be ensured. Thus, immediately after printing, prints cannot be put on top of one another. This is disadvantageous in high-speed printing. Further, this ink composition cannot in some cases produce high-quality prints.

An ink jet recording method using an electrostrictive element is advantageous in that printing can be carried out without thermal damage to the ink composition. Further, a recording head using an electrostrictive element has a great advantage such that the head can eject ink droplets several hundred millions of times and thus can be permanently used. In ink using a relatively large amount of solid matter, such as colorants, when the ink is not ejected for a long period of time, the ink dries on the front face of the nozzle in the recording head and thus is thickened, often leading to print disorder. By contrast, according to the head using an electrostrictive element, this problem can be overcome by delicately moving the ink at the front face of the nozzle on such a level that does not eject the ink from the nozzle, thereby stirring the ink. Therefore, the ink jet recording method using the electrostrictive element is advantageous in recording using an ink composition containing a high concentration of a colorant, such as a pigment.

Japanese Patent Laid-Open No. 157698/1995 discloses examples of ink compositions to which a 1,2-alkylene glycol has been added to reduce bleeding of the dye. This publication, however, does not disclose pigment-based ink compositions. In general, as compared with dyes, pigments are advantageously superior in waterfastness, lightfastness, and weatherfastness, and, at the same time, is less likely to cause color mixing. Further, so far as the present inventors know, mere use of the 1,2-alkylene glycol in ink compositions is likely to cause clogging in a head using an electrostrictive element.

Japanese Patent Laid-Open No. 18465/1992 discloses an ink composition containing some of the compounds represented by formula (I) which will be described later. This ink composition is used in an ink jet recording method wherein ink is ejected from an orifice of the recording head through the action of thermal energy to perform recording. In this case, the compound represented by formula (I) is used for improving the ejection stability of the ink in this recording method. This publication, however, does not disclose the combined use of the compound represented by formula (I) and glycerin.

SUMMARY OF THE INVENTION

The present inventors have now found that an ink composition comprising at least a compound having a specific structure and a colorant has excellent ejection stability and the use of this compound permits the viscosity of the ink composition to be easily regulated to a desired value. The present inventors have further found that, in an ink set comprising at least two ink compositions of the type described above, the ink set can yield high-quality prints by modifying the viscosities of the ink compositions to respective predetermined viscosity ranges. The present invention has been made based on such finding.

Accordingly, it is an object of the present invention to provide an ink composition for ink jet recording, which has excellent ejection stability, and an ink set for ink jet recording which comprises the above ink composition and can offer excellent print quality and ejection stability.

According to one aspect of the present invention, there is provided an ink composition for ink jet recording, comprising at least a compound represented by formula (I)

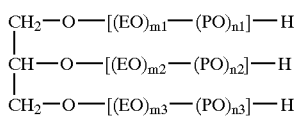
(I)

wherein

EO represents an ethyleneoxy group;

PO represents a propyleneoxy group;

m1, m2, m3, n1, n2, and n3 each are independently 0 (zero) or a natural number of not less than 1;

EO and PO may be arranged, regardless of order in the parentheses [ ], randomly or as blocks joined together; and m1+m2+m3+n1+n2+n3 is in the range of 0.5 to 10 in terms of number average of a mixture of compounds represented by formula (I), and a colorant, provided that when, in formula (I), all of n1, n2, and n3 are zero, said ink composition further comprises glycerin.

According to another aspect of the present invention, there is provided an ink set for ink jet recording, comprising at least two ink compositions of the type described above, characterized in that the ink set satisfies a relationship represented by formula (a) at least at 20° C.:

$$((\mu max - \mu min)/\mu max) \times 100 \leq 5\ (\%) \quad \text{(a)}$$

wherein $\mu$max represents the maximum viscosity value in the ink compositions of the ink set; and $\mu$min represents the minimum viscosity value in the ink compositions of the ink set.

According to the ink composition and the ink set of the present invention, prints with a lowered level of feathering or bleeding can be realized on plain paper, for example, on recycled paper, and, thus, prints having higher quality can be produced. Further, this ink set, even when used in recording heads using an electrostrictive element, is less likely to cause clogging, and, thus, can realize excellent ejection stability.

DETAILED DESCRIPTION OF THE INVENTION

Ink Composition

The ink composition according to the present invention is an ink composition for ink jet recording. Here the ink jet recording method generally refers to a method wherein ink droplets are ejected and deposited onto a recording medium to perform printing. In the present invention, ink jet recording methods include a method wherein droplets of an ink composition are ejected using an electrostrictive element and are deposited onto a recording medium to perform printing, and a method wherein bubbles of an ink composition are generated by partial heating and are ejected to perform printing.

The ink composition of the present invention is preferably used in an ink jet recording method wherein ink droplets are ejected by means of an electrostrictive element and are deposited onto a recording medium to perform printing.

The ink composition for ink jet recording according to the present invention basically comprises at least a compound represented by formula (I) and a colorant. In this case, in formula (I), EO represents an ethyleneoxy group, PO represents a propyleneoxy group, m1, m2, m3, n1, n2, and n3 each are independently 0 (zero) or a natural number of not less than 1, and EO and PO may be arranged, regardless of order in the parentheses of formula (I), randomly or as blocks joined together. When m1+m2+m3+n1+n2+n3 is expressed in terms of number average of a mixture of compounds represented by formula (I), m1+m2+m3+n1+n2+n3 is in the range of 0.5 to 10, preferably 2 to 8, more preferably 3 to 6. When m1+m2+m3+n1+n2+n3 is not less than 0.5, the print quality can be improved, while when this value is not more than 10, the viscosity of the ink composition is advantageously on a level suitable for use in ink jet recording.

In this connection, it should be noted that in formula (I), when all of n1, n2, and n3 are zero, the ink composition for ink jet recording according to the present invention further comprises at least glycerin in addition to the compound represented by formula (I) and the colorant.

The ink composition according to the present invention has excellent ejection stability. When the ejection stability of the ink composition is good, there is no variation in frequency characteristics of ink. This can eliminate the need to separately provide mechanisms for regulating ink ejection respectively for inks in the recording head, and, thus, can realize the control of ink ejection through a single mechanism.

According to one preferred embodiment of the present invention, in formula (I), even when none of n1, n2, and n3 are zero, the ink composition for ink jet recording may further comprise glycerin.

In the present invention, commercially available products as such may be used as the compound represented by formula (I), or alternatively, the commercially available products may be utilized after proper modification. Further, if necessary, the compound represented by formula (I) may be synthesized using glycerin or the like as a starting compound. Accordingly, processes usable for the production of the compound represented by formula (I) include, for example, a production process wherein glycerin is used as a starting compound and target molar amounts of ethylene oxide and propylene oxide are added to glycerin in an atmosphere of an alkali or the like, and a production process wherein a glycol compound, such as ethylene glycol, diethylene glycol, or propylene glycol, is added with dehydration to glycerin.

In the present invention, the compound represented by formula (I) may be a single compound composed of only one compound selected from the group consisting of the compounds represented by formula (I), or alternatively may be a mixture of two or more compounds selected from the group consisting of the compounds represented by formula (I). When the single compound selected from among the compounds represented by formula (I) is used, if necessary, the single compound may be separated from a mixture of two or more compounds among the compounds represented by formula (I) by applying a conventional process, such as distillation.

In the present invention, the compound represented by formula (I) is preferably a mixture of two or more compounds selected from the group consisting of the compounds represented by formula (I). The mixture is advantageous in that, when the ink composition according to the present invention is used in a head provided with an electrostrictive element, the anticlogging property is good and better print quality can be realized.

According to a preferred embodiment of the present invention, the compound represented by formula (I) is not more than 1000, more preferably not more than 800, still more preferably 600 to 1000, in terms of the average molecular weight. When the average molecular weight is not more than 1000, the viscosity of the ink composition can be brought to a suitable range for use and, at the same time, prints having higher quality can be advantageously realized.

In the ink composition according to the present invention, the amount of the compound represented by formula (I) added is preferably 0.1 to 30% by weight, more preferably 1 to 20% by weight, based on the amount of the whole ink composition.

According to a further preferred embodiment of the present invention, the surface tension of the ink composition for ink jet recording according to the present invention is not more than 40 mN/m, more preferably 28 to 35 mN/m or less, still more preferably 29 to 33 mN/m or less. When the surface tension of the ink composition is not more than 40 mN/m, the ink composition easily penetrates into ordinary paper, such as plain paper, and dries in a shortened time. Therefore, an unfavorable phenomenon called "offset" is less likely to take place wherein, in continuous printing, traces of previous print are left on paper which has been placed on the previous prints. Therefore, this is advantageous when high-speed printing is contemplated.

According to another preferred embodiment of the present invention, in order to bring the surface tension of the ink composition to not more than 40 mN/m, the ink composition further contains an 1,2-alkylene glycol wherein the alkylene group portion may be branched. In this case, when the content of the optionally branched 1,2-alkylene glycol in the ink composition according to the present invention is not less than 3% by weight based on the amount of the whole ink composition, the content of the compound represented by formula (I) is preferably at least 2% by weight, more preferably 3 to 20% by weight.

Further, in the 1,2-alkylene glycol, the alkylene group portion preferably has 4 to 10 carbon atoms, more preferably 4 to 6. More preferably, the 1,2-alkylene glycol is 1,2-pentanediol, 1,2-hexanediol, or a mixture of 1,2-pentanediol with 1,2-hexanediol. The ink composition according to the present invention preferably contains 1,2-pentanediol in an amount of 0.5 to 20% by weight, more preferably 5 to 10% by weight, based on the ink composition, or preferably contains 1,2-hexanediol in an amount of 0.3 to 15% by weight, more preferably 1 to 10% by weight, based on the ink composition, or more preferably contains a mixture of these alkylene glycols.

The ink composition according to the present invention preferably further contains (di)propylene glycol monobutyl ether in addition to the 1,2-alkylene glycol. The surface tension of the ink composition may be brought to not more than 40 mN/m by this constitution. Further, according to the ink composition of the present invention, the addition of the (di)propylene glycol monobutyl ether can improve the penetration of the ink composition.

According to the ink composition of the present invention, the amount of (di)propylene glycol monobutyl ether added is preferably 0 to 10% by weight, more preferably 0.5 to 5% by weight, based on the amount of the whole ink composition. When the amount of the (di)propylene glycol monobutyl ether added is not more than 10% by weight, a preferred penetration level of the ink composition can be advantageously ensured. Further, according to the ink composition of the present invention, the weight ratio of the 1,2-alkylene glycol to the (di)propylene glycol monobutyl ether is more preferably 1:0 to 1:10, still more preferably 1:0.5 to 1:5.

The ink composition according to the present invention preferably further contains an acetylene glycol surfactant in addition to the 1,2-alkylene glycol. The surface tension of the ink composition may be brought to not more than 40 mN/m by this constitution. Further, the addition of the acetylene glycol surfactant can further improve print quality.

In the ink composition according to the present invention, the amount of the acetylene glycol surfactant added is preferably 0 to 5% by weight, more preferably 0.1 to 2% by weight, based on the amount of the whole ink composition. When the amount of the acetylene glycol surfactant added is not more than 5% by weight, the print quality can be advantageously improved without undergoing the influence of an increase in viscosity of the ink composition.

In the ink composition according to the present invention, the weight ratio of the 1,2-alkylene glycol to the acetylene glycol surfactant is more preferably 1:0 to 1:3, still more preferably 1:0.1 to 1:1. The addition of the acetylene glycol surfactant in this ratio range is preferred from the viewpoint of ensuring excellent print quality.

Preferred acetylene glycol surfactants usable in the present invention include, for example, Surfynol series manufactured by Air Products and Chemicals Inc.

The ink composition according to the present invention preferably further contains di(tri)ethylene glycol monobutyl ether in addition to the 1,2-alkylene glycol. The surface tension of the ink composition may be brought to not more than 40 mN/m by this constitution. Further, the addition of di(tri)ethylene glycol monobutyl ether can further improve print quality. Furthermore, the water solubility of the ink composition can be ensured.

In the ink composition according to the present invention, the amount of di(tri)ethylene glycol monobutyl ether added is preferably 0 to 20% by weight, more preferably 0.5 to 10% by weight, based on the amount of the whole ink composition.

In the ink composition according to the present invention, the weight ratio of the 1,2-alkylene glycol to the di(tri)ethylene glycol monobutyl ether is more preferably 1:0 to 1:10, still more preferably 1:0.1 to 1:5.

In the ink composition according to the present invention, the colorant may be properly selected from water-soluble dyes or pigments. The water-soluble dye and the pigment may be optionally properly used in combination.

According to the present invention, various dyes commonly used in ink jet recording, such as direct dyes, acid dyes, foodstuff dyes, basic dyes, reactive dyes, disperse dyes, vat dyes, and soluble vat dyes, may be used as the water-soluble dye.

The pigment is not particularly limited, and, for example, various pigments, such as inorganic pigments or organic pigments, may be used. Therefore, according to the present invention, the pigment may be one which is dispersible in an ink composition with the aid of a dispersant or a surfactant. The pigment, however, is preferably a surface treated pigment which has a dispersing group on its surface and is dispersible in an aqueous solvent without any dispersant. Here the dispersing group refers to a group which renders a pigment dispersible in an aqueous solvent solely, that is, without the addition of any dispersant. Specific examples of dispersing groups include carboxyl, carbonyl, hydroxyl, and sulfonic acid groups.

The introduction of the dispersing group into the surface of the pigment may be carried out by a suitable method according to the type of the dispersing group. For example, carboxyl or hydroxyl groups are preferably introduced by oxidation. Here the oxidation refers to a method wherein the pigment is oxidized in a liquid phase or gaseous phase with an oxidizing agent, for example, ozone, nitric acid, hydrogen peroxide, hypohalous acid, nitrogen oxide, or fluorine gas. Plasma treatment of the surface of the pigment also can introduce carboxyl or hydroxyl groups into the surface of the pigment. On the other hand, when sulfonic acid groups are introduced as the dispersing group, the sulfonic acid groups can be introduced by sulfonation.

The surface treated pigment is also stable against glycol ethers, for example, (di)propylene glycol monobutyl ether and di(tri)ethylene glycol monobutyl ether which are used as a surface tension modifier. This is advantageous over the dispersion of the pigment with the aid of a dispersant in that the ink composition can withstand severer conditions and, at the same time, can be stably used even under high-temperature or low-temperature conditions.

In the present invention, the content of the surface treated pigment is preferably 1 to 15% by weight, more preferably 3 to 10% by weight, based on the ink composition.

Further, the ink composition according to the present invention may properly contain optional ingredients, such as nozzle clogging preventives, preservatives, antimolds, antioxidants, electric conductivity adjustors, pH adjustors, viscosity modifiers, other surface tension modifiers, and oxygen absorbers. These optional ingredients may be used solely or as a mixture of a plurality of optional ingredients falling within the same category or a plurality of optional ingredients selected from different categories.

For example, water-soluble glycols or saccharides may be used as nozzle clogging preventives for preventing the ink composition from being dried at the front face of nozzles in the recording head.

Examples of water-soluble glycols usable herein include ethylene glycol, diethylene glycol, triethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,2-pentanediol, 1,5-pentanediol, 1,2-hexanediol, 1,6-hexanediol, 1,2,6-hexanetriol, 1,8-octanediol, 1,2-octanediol, glycerin, mesoerythritol, and pentaerythritol.

Saccharides usable herein include monosaccharides and polysaccharides. More specific examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses.

Examples of compounds which are properly usable in the ink composition according to the present invention include glycol ethers, which are compatible with water and have low solubility in water contained in the ink composition, and compounds which can improve the solubility of the ink ingredients and, in addition, can improve the penetration into recording media, for example, paper, or can be used for preventing clogging of the nozzles. Specific examples of such compounds include: alkyl alcohols having 1 to 4 carbon atoms; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; formamide; acetamide; dimethyl sulfoxide; sorbit; sorbitan; acetin; diacetin; triacetin; and sulfolane.

The ink composition according to the present invention may further comprise other surfactant from the viewpoint of regulating the penetration of the ink composition into recording media, or regulating the surface tension of the ink composition. The surfactant is preferably highly compatible with the ink composition according to the present invention. Further, the surfactant preferably has high penetration and is stable. Such surfactants include, for example, amphoteric surfactants and nonionic surfactants.

Specific examples of amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives.

Specific examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acid.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI) may be used as preservatives and antimolds.

pH adjustors, solubilizers, or antioxidants usable herein include: amines, for example, alkanolamines, such as diethanolamine, triethanolamine, and propanolamine, alkylalkanolamines, such as methyldiethanolamine, dimethylethanolamine, ethyldiethanolamine, and diethylethanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

Viscosity modifiers include rosins, alginic acids, polyvinyl alcohol, hydroxypropylcellulose, carboxymethylcellulose, hydroxyethylcellulose, methylcellulose, salts of polyacrylic acid, polyvinylpyrrolidone, gum arabic, and starch.

Ink Set

The ink set for ink jet recording according to the present invention comprises at least two ink compositions of the type described above, characterized in that said ink set satisfies a relationship represented by formula (a) at least at 20° C.:

$$((\mu max - \mu min)/\mu max) \times 100 \leq 5(\%) \quad (a)$$

wherein $\mu max$ represents the maximum viscosity value in the ink compositions of the ink set; and $\mu min$ represents the minimum viscosity value in the ink compositions of the ink set.

According to a preferred embodiment of the present invention, in the ink set, the relationship represented by formula (a) is preferably always satisfied at 15 to 45° C. The actual service temperature of the ink composition in ink jet printers is generally 15 to 45° C.

In the ink set according to the present invention, when two or more ink compositions according to the present invention constituting the ink set satisfy the relationship represented by formula (a) at 20° C., the frequency characteristics of ink become preferred. Therefore, in printing, the variation in dot size is reduced and, thus, printing can be stably carried out.

In the ink set according to the present invention, the ink set can be regulated so as to satisfy the relationship represented by formula (a) by properly regulating the amount of the compound represented by formula (I) added in each of the ink compositions constituting the ink set.

When the ink compositions constituting the ink set are different from each other or one another in ingredients, this means that the molecular weight of the ingredients and the particle diameter vary from ink to ink. Therefore, the viscosity of the whole ink set should be regulated. To this end, it is common practice to add additives such as glycerin. When ink compositions are greatly different from each other in molecular weight or polarity of materials, the ink compositions are sometimes greatly different from each other in frequency characteristics. In this case, the amount of additives such as glycerin should be increased to modify the viscosity of ink. Increasing the amount of the additive, however, is sometimes unfavorable because this affects other properties of the ink composition per se. The compound represented by formula (I) is advantageous in that the amount of the compound required for modifying the viscosity of the ink composition is smaller than that of glycerin required for this purpose. Therefore, the ink set according to the present invention is advantageous in that the viscosity of each ink composition can be easily modified by properly regulating the amount of the compound represented by formula (I) added.

In the present invention, when the ink composition included in the ink set further contains glycerin, the viscosity of the ink composition can be easily modified by regulating the total amount of glycerin and the compound represented by formula (I). This is because glycerin and the compound represented by formula (I) can be intimately mixed together and, in addition, both the compounds are less likely to affect frequency characteristics of inks.

According to another preferred embodiment of the present invention, at least two ink compositions contained in the ink set are identical to each other in color but different from each other in color density. Here "at least two ink compositions identical to each other in color but different from each other in color density" refers to, for example, a combination of a magenta ink composition having high color density with a magenta ink composition having low color density (light magenta). Therefore, for example, also for other color ink compositions, such as black, cyan, yellow, orange, and green ink compositions, when an ink composition having low color density (light ink) is present, the same matter as described above in connection with the magenta ink compositions is true of each of these color ink compositions.

According to other preferred embodiment of the present invention, in the ink set, the colorant contained in each of the ink compositions is a pigment and the viscosities of the ink compositions as measured with a rotating viscometer at a torque of 1 mN·m to 100 N·m satisfy the relationship represented by formula (a). Here Rheometer RIS-2 manufactured by Rheometrix Corp. may be mentioned as a specific example of the rotating viscometer suitable for use in the measurement of the viscosity (measured at 20° C.).

When the torque of the rotating viscometer falls within the above defined range, if the measured viscosities of the ink compositions satisfy the relationship represented by formula (a), then it becomes easy to grasp the pseudoplastic flow properties of each ink. Therefore, a difference in frequency characteristics between inks in ink jet recording can be minimized.

According to a preferred embodiment of the present invention, for at least one ink composition contained in the ink set according to the present invention, the content of the colorant is not less than 5% by weight. The colorant content of not less than 5% by weight is advantageous in that, in ink jet recording, the color development of records is excellent.

Recording Method

The ink set according to the present invention can be used in a recording method wherein ink compositions are deposited onto a recording medium to perform printing.

According to another aspect of the present invention, there is provided an ink jet recording method comprising the steps of: ejecting droplets of an ink composition in the ink set; and depositing the droplets onto a recording medium to perform printing.

According to the present invention, there is also provided a record produced by the recording method.

Further, according to the present invention, there is further provided an ink jet recording apparatus using the ink set for ink jet recording that can provide an ink jet system capable of realizing stable ejection.

EXAMPLES

The present invention will be described in more detail with reference to the following examples, which should not be construed as limiting the scope of the present invention.

Preparation of Ink Compositions

The following ingredients were mixed together to prepare ink compositions 1 to 11.

In the following, all of pigments 1 to 4 are a surface treated pigment which has a dispersing group on its surface and is dispersible in an aqueous solvent without any dispersant. These surface treated pigments were prepared by oxidizing the surface of carbon black having a particle diameter of 10 to 300 nm to introduce dispersing groups, such as carbonyl, carboxyl, hydroxyl, or sulfone groups. On the other hand, pigments 5 and 6 are not a surface treated pigment, but pigments prepared by dispersing pigment particles with the aid of a dispersant, more specifically pigments prepared by dispersing carbon black particles with the aid of a styrene-acrylic acid random copolymer dispersant.

In the following description, the numeric value within parentheses after the pigment represents the average particle diameter of the pigment particles which is in nm.

In the following description, water-soluble dyes 1 to 4 are respectively the following dyes.

Water-soluble dye 1: Direct Black 154
Water-soluble dye 2: Direct Yellow 132
Water-soluble dye 3: Direct Blue 86
Water-soluble dye 4: Acid Red 52

Further, in the following ink compositions, water as the balance contained 0.001 to 0.05% of benzotriazole for preventing the corrosion of ink jet recording head members and 0.01 to 0.03% of EDTA for reducing the influence of metal ions contained in the ink system.

In the following description, the content of each ingredient in the ink composition was expressed in terms of the weight percentage of the weight of each ingredient based on the weight of the whole ink composition.

In the following description, DEGmBE represents diethylene glycol monobutyl ether, TEGmBE triethylene glycol monobutyl ether, PGmBE propylene glycol monobutyl ether, DPGmBE dipropylene glycol monobutyl ether, and DEGmME diethylene glycol monomethyl ether.

| Ink composition 1 | |
|---|---|
| | Amount added (wt %) |
| Pigment 1 (105) | 5.0 |
| Compound 1 of formula (I) | 8.0 |
| DEGmBE | 8.0 |
| OLFINE STG | 0.8 |
| Diethylene glycol | 10.0 |
| 2-Pyrrolidone | 5.0 |
| Triethanolamine | 0.8 |
| Ion-exchanged water | Balance |

Compound 1 is representated by formula (I) in which $m1+m2+m3+n1+n2+n3$ is 2 and, at the same time, n1, n2, and n3 each are 0 (zero). That is, Compound 1 has only ethyleneoxy (EO) in the parentheses in formula (I).

| Ink composition 2 | |
|---|---|
| Pigment 2 (85) | 4.5 |
| Compound 2 of formula (I) | 10.0 |
| DPGmBE | 3.0 |
| DEGmBE | 5.0 |
| OLFINE E 1010 | 1.0 |
| Dipropylene glycol | 5.0 |
| Surfynol 465 | 1.2 |
| Triethanolamine | 0.9 |
| Ion-exchanged water | Balance |

Compound 2 is represented by formula (I) in which $m1+m2+m3+n1+n2+n3$ is 0.8 and, at the same time, n1, n2, and n3 each are 0 (zero). That is, Compound 2 has only ethyleneoxy (EO) in the parentheses in formula (I).

| Ink composition 3 | |
|---|---|
| Pigment 3 (90) | 5.5 |
| Compound 3 of formula (I) | 2.0 |
| PGmBE | 3.5 |
| TEGmBE | 5.0 |
| Surfynol 104 | 0.3 |
| Diethylene glycol | 7.0 |
| Thiodiglycol | 3.5 |
| 1,6-Hexanediol | 5.0 |
| Diethylethanolamine | 1.0 |
| Potassium hydroxide | 0.1 |
| Ion-exchanged water | Balance |

Compound 3 is represented by formula (I) in which $m1+m2+m3+n1+n2+n3$ is 4 and, at the same time, ethyleneoxy and propyleneoxy are present in a ratio of 3:1 in the parentheses in formula (I).

| Ink composition 4 | |
|---|---|
| Pigment 4 (80) | 5.0 |
| Water-soluble dye 1 | 1.0 |
| Compound 4 of formula (I) | 8.0 |
| DEGmBE | 5.0 |
| TEGmBE | 5.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

Compound 4 is represented by formula (I) in which $m1+m2+m3+n1+n2+n3$ is 1.5 and, at the same time, n1, n2, and n3 each are 0 (zero). That is, Compound 4 has only ethyleneoxy (EO) in the parentheses in formula (I).

| Ink composition 5 | |
|---|---|
| Pigment 1 (105) | 3.0 |
| Water-soluble dye 1 | 1.0 |
| Compound 5 of formula (I) | 10.0 |
| DEGmBE | 9.0 |
| OLFINE STG | 0.3 |
| Glycerine | 7.0 |
| Triethanolamine | 0.9 |
| Ion-exchanged water | Balance |

Compound 5 is represented by formula (I) in which $m1+m2+m3+n1+n2+n3$ is 2.8 and, at the same time, n1, n2, and n3 each are 0 (zero). That is, Compound 5 has only ethyleneoxy (EO) in the parentheses in formula (I).

| Ink composition 6 | |
|---|---|
| Water-soluble dye 2 | 5.0 |
| Compound 6 of formula (I) | 6.0 |
| DPGmBE | 4.0 |
| DEGmBE | 8.0 |
| Glycerin | 10.0 |
| Thiodiglycol | 2.0 |
| 1,5-Pentanediol | 1.0 |
| Triethanolamine | 0.9 |
| Ion-exchanged water | Balance |

Compound 6 is represented by formula (I) in $m1+m2+m3+n1+n2+n3$ is 3.5 and, at the same time, n1, n2, and n3 each are 0 (zero). That is, Compound 6 has only ethyleneoxy (EO) in the parentheses in formula (I).

| Ink composition 7 | |
|---|---|
| Water-soluble dye 3 | 5.0 |
| Compound 7 of formula (I) | 10.0 |
| DEGmBE | 8.0 |
| Glycerin | 5.0 |
| Trimethylolpropane | 1.0 |
| Trimethylolethane | 1.0 |
| Surfynol 465 | 1.0 |
| Triethanolamine | 0.5 |
| KOH | 0.05 |
| Ion-exchanged water | Balance |

Compound 7 is represented by formula (I) in which $m1+m2+m3+n1+n2+n3$ is 10 and, at the same time, n1, n2, and n3 each are 0 (zero). That is, in the case of Compound 7 has only ethyleneoxy (EO) in the parentheses in formula (I).

| Ink composition 8 | |
|---|---|
| Water-soluble dye 4 | 5.5 |
| Compound 8 of formula (I) | 6.0 |
| DEGmBE | 5.0 |
| Glycerin | 5.0 |
| Diethylene glycol | 5.0 |
| Tetrapropylene glycol | 5.0 |
| Triethanolamine | 0.9 |
| KOH | 0.1 |
| Ion-exchanged water | Balance |

Compound 8 is represented by formula (I) in which m1+m2+m3+n1+n2+n3 is 4.5 and, at the same time, n1, n2, and n3 each are 0 (zero). That is, Compound 8 has only ethyleneoxy (EO) in the parentheses in formula (I).

| Ink composition 9 (comparative) | |
|---|---|
| Pigment 5 (90) | 5.0 |
| Glycerin | 10.0 |
| Dispersant | 3.0 |
| Nonionic surfactant | 1.0 |
| Ion-exchanged water | Balance |
| Ink composition 10 (comparative) | |
| Water-soluble dye (Food Black 2) | 5.5 |
| DEGmME | 7.0 |
| Diethylene glycol | 10.0 |
| 2-Pyrrolidone | 5.0 |
| Ion-exchanged water | Balance |
| Ink composition 11 (comparative) | |
| Pigment 6 (110) | 5.5 |
| Water-soluble dye (Food Black 2) | 2.5 |
| Diethylene glycol | 10.0 |
| Nonionic surfactant | 1.0 |
| Ion-exchanged water | Balance |

Evaluation Test

Evaluation Test A: Ejection Stability

For all the ink compositions 1 to 8 thus prepared, the ejection stability was good, and, according to evaluation criteria described below, to which grade "A" was asigned.

Based on the ink compositions 1 to 8, groups of ink compositions of Examples 1 to 8 were prepared in the following manner, and were tested for ejection stability.

With regard to ink composition 1, the half of the colorant added in this composition was replaced with any one of (1) the compound represented by formula (I) in the ink composition, (2) glycerin, (3) polyethylene glycol 1000, (4) ethylene oxide (30 mol) adduct of glycerin, and (5) polysaccharide [a mixture of tetra- or higher straight-chain oligosaccharides (tradename: TETRUP H, manufactured by HAYASHIBARA SHOJI, Inc.)] to give prepare five ink compositions 1-1 to 1-5. The viscosity was regulated so that the difference in viscosity between the ink compositions thus prepared and the ink composition 1 was not more than 5% based on the viscosity of the ink composition 1. That is, the prepared ink compositions were regulated so that the relationship represented by formula (a) was satisfied between the prepared ink compositions and the ink composition 1. A group of ink compositions based on the ink composition 1 are designated as the ink compositions of Example 1.

Each of the ink compositions 1-1 to 1-5 of Example 1 was tested for ejection stability as follows. In the test, the ink composition to be evaluated was loaded into an ink jet printer MJ-900C manufactured by Seiko Epson Corp., and printing was continuously carried out at 40° C. on 20000 pages of plain paper of size A4 (Xerox 4024, manufactured by Xerox Corp.) (average number of printed characters per page: 1000).

The results were evaluated according to the following evaluation criteria.

A: Dropouts of dots took place.

B: Dropouts of dots took place in 1 to 5 positions on average per 100 pages.

C: Dropouts of dots took place in 6 to 20 positions on average per 100 pages.

D: Dropouts of dots took place in not less than 21 positions on average per 100 pages.

In the same manner as described above, for each of ink compositions 2 to 8, ink compositions, wherein the half of the colorant was replaced with the materials (1) to (5) above, were prepared. Thus, groups of ink compositions respectively according to Examples 2 to 8 were prepared. The ink compositions thus obtained were tested for ejection stability in the same manner as described above.

The results were as summarized in Table 1.

Evaluation Test B: Print Quality

The ink compositions 1 to 11 thus obtained were provided, and were then bidirectionally printed as a plurality of character line patterns having different sizes on the following predetermined test papers. The prints thus obtained were visually inspected for blurring of characters and feathering of characters due to ink migration down paper fibers to evaluate print quality.

The printing was performed by means of an ink jet printer MJ-930C under conditions of 360 dpi and fine mode for plain paper. In this evaluation test, plain papers commercially available in Europe, America, and Japan, specifically Conqueror (manufactured by Arjo Wiggins), Favorit (manufactured by XEROGRAFIE), Modo Copy (manufactured by Modo), Rapid Copy (manufactured by igepa), EPSON EPP (manufactured by Seiko Epson Corporation), Xerox P (manufactured by Xerox Corp.), Xerox 4024 (manufactured by Xerox Corp.), Xerox 10 (manufactured by Xerox Corp.), Neenha Bond (manufactured by Kimberly-Clark), Ricopy 6200 (manufactured by Ricoh Co., Ltd.), Yamayuri (manufactured by Honshu Paper Co., Ltd.), and Xerox R (manufactured by Xerox Corp.), were used as test papers.

The results were evaluated according to the following evaluation criteria.

A: A Japanese Kanji character "書" in a JIS Minchou form at a size of 3 mm square could be printed without overlapping.

B: A Japanese Kanji character "書" in a JIS Minchou form at a size of 4 mm square could be printed without overlapping.

C: Overlapping was observed in a printed Japanese Kanji character "書" in a JIS Minchou form at a size of 4 mm square.

D: Overlapping was observed in a printed Japanese Kanji character "書" in a JIS Minchou form at a size of 5 mm square.

The results were as summarized in Table 2.

Evaluation Test C: Anti-clogging Property

The ink composition 1 was loaded into an ink jet printer MJ-930C manufactured by Seiko Epson Corporation, and the printer was allowed to stand under conditions of temperature 60° C. and relative humidity 40% for one week. One week after the initiation of the standing, this printer required not more than three cleaning operations for return to normal ejection of the ink composition through all the nozzles.

On the other hand, the same test was carried out for the ink compositions to which the compound represented by formula (I) had not been added. As a result, three or more cleaning operations were necessary for return to normal ejection of the ink composition through all the nozzles. The printer MJ-930C is a printer wherein a head using a piezoelectric element, which is an electrostrictive element, has been adopted.

Evaluation Test D: Print Quality

With regard to ink composition 1, only carbon black as the colorant was replaced by other pigments to prepare ink compositions of other colors, i.e., Cyan, magenta, and yellow. Pigment Blue 15:3 was used as cyan, Pigment Red 122 as magenta, and Pigment Yellow 138 as yellow. These pigments were dispersed in the ink compositions with the aid of a styrene-acryl dispersant. For the particle diameter of the pigments, cyan was 80 nm, magenta 100 nm, and yellow 95 nm. In the preparation of the other color ink compositions, the compound represented by formula (I) was added so that, when the viscosity (20° C.) of the ink composition 1 using carbon black was presumed to be 1, the other color ink compositions had respective predetermined viscosity values (relative ratio).

Thus, an ink set 1 comprising black, cyan, magenta, and yellow ink compositions based on the chemical composition of the ink composition 1 was prepared.

The ink set 1 was loaded into an ink jet printer MJ-930C manufactured by Seiko Epson Corporation, and predetermined color patches and 4000 characters per page were microdot printed by 500 pages of plain paper of size A4. In this case, the prints were inspected for print disorder, and the results were evaluated according to the following evaluation criteria. The color patch pattern printed for the evaluation was composed of 30% of blotted images, 10% of longitudinal lines, 10% of horizontal lines, 30% of characters (alphabetical characters and Japanese characters), and 20% of pictures.

A: Print disorder did not take place at all.
B: Print disorder took place 1 to 5 times.
C: Print disorder took place 6 to 10 times.
D: Print disorder took place 11 times or more.

The results were as summarized in Table 3.

TABLE 1

Results of evaluation test A (evaluation of ejection stability)

| Material substituted for half amount of colorant | Example | | | | | | | |
|---|---|---|---|---|---|---|---|---|
| | 1 | 2 | 3 | 4 | 5 | 6 | 7 | 8 |
| (1) Compound of formula (I) | A | A | A | A | A | A | A | A |
| (2) Glycerin | A | B | A | A | A | A | A | A |
| (3) Polyethylene glycol 1000 | D | C | D | D | B | C | B | C |
| (4) Ethylene oxide (30 mol) adduct of glycerin | D | D | D | D | C | D | C | D |
| (5) Polysaccharide (mixture of tetra- or higher straight-chain oligosaccharides) | D | D | D | D | C | D | C | D |

TABLE 2

Results of evaluation test B (Print quality evaluation test)

| Type of paper | Ink composition | | | | | | | | | | |
|---|---|---|---|---|---|---|---|---|---|---|---|
| | 1 | 2 | 3 | 4 | 5 | 6 | 7 | 8 | 9 | 10 | 11 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | C | D | D |
| EPSON KPP | A | A | A | A | A | A | A | A | C | C | D |
| Xerox P | A | A | A | A | A | A | A | A | B | D | D |
| Xerox 4024 | A | A | A | A | A | A | A | A | C | D | D |
| Xerox 10 | A | A | A | A | A | A | A | A | C | D | D |
| Neenha Bond | A | B | A | A | A | A | A | A | C | D | D |
| Ricopy 6200 | A | A | A | A | A | A | A | A | C | C | D |
| Yamayuri | A | B | A | A | A | A | A | A | D | D | D |
| Xerox R | A | A | A | A | A | A | A | A | C | D | D |

TABLE 3

Results of evaluation test D

Ratio of viscosity of each ink composition to viscosity of black ink

| Black | 1 | 1 | 1 | 1 | 1 | 1 | 1 |
|---|---|---|---|---|---|---|---|
| Cyan | 1.10 | 1.06 | 0.94 | 1.05 | 0.95 | 1.04 | 0.96 |
| Magenta | 1.10 | 1.06 | 0.94 | 1.05 | 0.95 | 1.04 | 0.96 |
| Yellow | 1.10 | 1.06 | 0.94 | 1.05 | 0.95 | 1.04 | 0.96 |
| Evaluation | D | C | C | B | B | A | A |

What is claimed is:

1. An ink composition for ink jet recording, comprising a compound represented by formula (I)

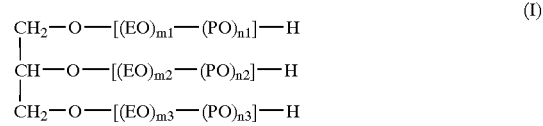

wherein
EO represents an ethyleneoxy group;
PO represents a propyleneoxy group;
m1, m2, m3, n1, n2, and n3 each is independently zero or a natural number of not less than 1;
EO and PO may be arranged, regardless of order in the parentheses, randomly or as blocks joined together; and
m1+m2+m3+n1+n2+n3 is in the range of 0.5 to 10 in terms of number average of a mixture of compounds represented by formula (I), and a colorant,
said ink composition further comprising glycerin.

2. The ink composition according to claim 1, wherein the colorant comprises a water-soluble dye and/or a pigment.

3. The ink composition according to claim 2, wherein the pigment is a surface treated pigment which has a dispersing group on its surface and is dispersible in an aqueous solvent without any dispersant.

4. The ink composition according to claim 1, wherein the compound represented by formula (I) is a mixture of at least two or more compounds selected from the group consisting of the compounds represented by formula (I).

5. The ink composition according to claim 1, wherein the compound represented by formula (I) has an average molecular weight of not more than 1000.

6. The ink composition according to claim 1, wherein the ink composition has a surface tension of not more than 40 mN/m.

7. The ink composition according to claim 6, which further comprises a 1, 2-alkylene glycol in which the alkylene group may be branched.

8. The ink composition according to claim 7, wherein when the amount of 1, 2-alkylene glycol added is not less than 3% by weight, the amount of the compound represented by formula (I) added is at least 2% by weight.

9. The ink composition according to claim 8, wherein the alkylene group of 1, 2-alkylene glycol has 4 to 10 carbon atoms.

10. The ink composition according to claim 9, wherein the 1, 2-alkylene glycol is 0.5 to 20% by weight of 1, 2-pentanediol, 0.3 to 15% by weight of 1, 2-hexanediol, or a mixture of said 1, 2-alkylene glycols.

11. The ink composition according to claim 7, which further comprises 0 to 10% by weight of (di)propylene glycol monobutyl ether and the weight ratio of the 1, 2-alkylene glycol to (di)propylene glycol monobutyl ether is 1:0 to 1:10.

12. The ink composition according to claim 7, which further comprises 0 to 5% by weight of an acetylene glycol surfactant and the weight ratio of the 1, 2-alkylene glycol to the acetylene glycol to the acetylene glycol surfactant is 1:0 to 1:3.

13. The ink composition according to claim 7, which further comprises 0 to 20% by weight of di(tri)ethylene glycol monobutyl ether and the weight ratio of the 1, 2-alkylene glycol to the di(tri)ethylene glycol monobutyl ether is 1:0 to 1:10.

14. An ink set for ink jet recording, comprising at least two ink compositions according to claim 1, characterized in that said ink set satisfies a relationship represented by formula (a) at least at 20°C.:

$$((\mu max - \mu min)/\mu max) \times 100 \leq 5 (\%) \quad (a)$$

wherein $\mu max$ represents the maximum viscosity value in the ink compositions contained in the ink set; and $\mu min$ represents the minimum viscosity value in the ink compositions contained in the ink set.

15. The ink set according to claim 14, which always satisfies the relationship represented by formula (a) at 15 to 45° C.

16. The ink set according to claim 14, wherein said at least two ink compositions are identical to each other in color but different from each other in color density.

17. The ink set according to claim 14, wherein the colorant contained in each of the ink compositions is a pigment and the viscosities of the ink compositions as measured with a rotating viscometer at a torque of 1 mN/m to 100 Nm satisfy the relationship represented by formula (a).

18. The ink set according to claim 14, wherein at least one of the ink compositions has a colorant content of not less than 5% by weight.

19. An ink jet recording method comprising the steps of: (a) providing the ink composition of claim 1; (b) ejecting droplets of the ink composition; and (c) depositing the droplets onto a recording medium to form a record.

20. The record produced by the method according to claim 19.

21. An ink jet recording method comprising the steps of: (a) providing the ink set of claim 14; (b) ejecting droplets of the at least two ink compositions of the ink set; and (c) depositing the droplets onto a recording medium to form a record.

22. The record produced by the method of claim 21.

23. The ink composition according to claim 1, wherein the glycerin is present in the ink composition in an amount of 5-10% by weight.

* * * * *